United States Patent [19]

Moyer

[11] 4,009,854

[45] Mar. 1, 1977

[54] POLICE OFFICER'S CLUB HOLDER FOR VEHICLE DOOR

[76] Inventor: Charles G. Moyer, 532 Volney St., Phoenix, N.Y. 13135

[22] Filed: Dec. 5, 1975

[21] Appl. No.: 637,936

[52] U.S. Cl. .................................. 248/300; 211/63; 248/314

[51] Int. Cl.² ......................................... A47F 5/00

[58] Field of Search ............ 248/300, 314; 211/62, 211/63, 69.5, 73, 60 R, 6 A; 224/29 R, 42.45 R

[56] References Cited

UNITED STATES PATENTS

| | | | |
|---|---|---|---|
| 664,217 | 12/1900 | Vencke et al. | 211/62 |
| 746,540 | 12/1903 | Luhe et al. | 211/69.5 |
| 1,665,590 | 4/1928 | Hirtz et al. | 211/63 |
| 2,017,319 | 10/1935 | McMullen | 224/45 R |
| 3,273,769 | 9/1966 | Miller | 211/63 |
| 3,292,890 | 12/1966 | Bassett | 248/314 |

FOREIGN PATENTS OR APPLICATIONS 201,157   2/1939   Switzerland ..................... 211/63

Primary Examiner—Robert A. Hafer
Attorney, Agent, or Firm—Bruns & Jenney

[57] ABSTRACT

A one-piece club holder for attachment to a vehicle door has a closed-end ring-shaped socket at its lower end and a transversely extending, U-shaped clamp at its upper end connected by a narrow strip having holes therethrough for fasteners to secure it to the inside of the vehicle door. Midway of the ends the strip has a portion widened on an arc to pass partially around the club, the widened portion being progressively widened toward the lower end to pass halfway around the club. The bracket is adapted to be fastened to the inner side of the door at its opening side at an angle of from 30° to 45° from the vertical so that the upper end of the club is available to be grasped for removal immediately when the door is opened.

1 Claim, 5 Drawing Figures

POLICE OFFICER'S CLUB HOLDER FOR VEHICLE DOOR

BACKGROUND OF THE INVENTION

This invention relates generally to automobile accessories and more particularly to means adapted for attachment to an automobile door for receiving and removably retaining a police officer's club for use immediately upon opening the door.

So far as applicant can learn there are no prior art club-receiving brackets for holding a police officer's club secured to the car door. Many officers use a broom clip of spring metal which clamps around the club for supporting it vertically, but such clips lose their spring with repeated use with the result that the club slips out of the clip on opening the door. Other officers use the lopped thong, used around the wrist for hand carrying the club, by slipping it over the upstanding pin for locking the door at the upper edge of the door inside the window. This results in a continuous rattle while driving and awkward swinging of the club on opening and closing the door.

Other racks for slender articles, such as for guns and umbrellas, are usually in two pieces and the articles are so long that they cannot be carried on the door for immediate use because they are too long or interfere with the door mechanism, such as arm rests, unlatching levers, and window raising and lowering cranks.

SUMMARY OF THE INVENTION

The present invention contemplates a one piece bracket or holder adapted to be fastened to the inner side of a vehicle door at its trailing or opening side for removably retaining therein a police officer's club in position for immediate use by the officer upon opening the door. Such clubs have become substantially standardized in size as about two feet long and slightly less than 1½ inches in diameter and the bracket is designed to be fastened to the door, inclined with the top toward the rear, at an angle to the vertical of the order of 30° to 45°. In this manner the bottom end of the bracket can be fastenend under the usual armrest on the door alongside the driver's seat and out of the way so as not to interfere with the driver. At this angle the top of the club can pass to the rear of the armrest with the top end near the upper rear corner of the door panel where it is readily graspable for removal from the bracket upon opening the car door.

The holder, preferably made of 16 gauge stainless steel, is shorter than the club and has a bottom end formed into a substantially circular hollow socket open at its top and closed at its bottom for containing the lower end of the club. Joining the socket to its top end is a comparatively narrow flat strip adapted to be secured by appropriate fasteners, such as sheet metal screws, to the inside panel of the door. The top end of the holder comprises a transversely projecting U-shaped clip bent semicircularly at one side, the rearward and lower side to pass around the club, the other end of the clip projecting on either side of the club for easy insertion and withdrawal of the club from the bracket. One projecting leg of the clip comprises the upper end of the narrow connecting strip, which is flat for seating against the car door and the other leg of the clip projects straight from the semicircular side of the clip and terminates in an end bent slightly outward for guiding the club end as it is inserted into the clip. The projecting legs of the clip are inclined slightly toward one another for exerting a slight clamp action on the club end when it is inserted therebetween.

Substantially midway between top and bottom of the connecting strip it is widened to project arcuately part way around the club and the lower end of the strip is tapered to progressively widen arcuately at the lower, socket end of the strip where it is substantially semicircular at its merging with the socket end. This arcuately widening lower portion of the strip forms a guide for the lower end of the club when it is inserted into the socket end of the bracket.

DESCRIPTION OF THE PREFERRED EMBODIMENT

Figure 1:
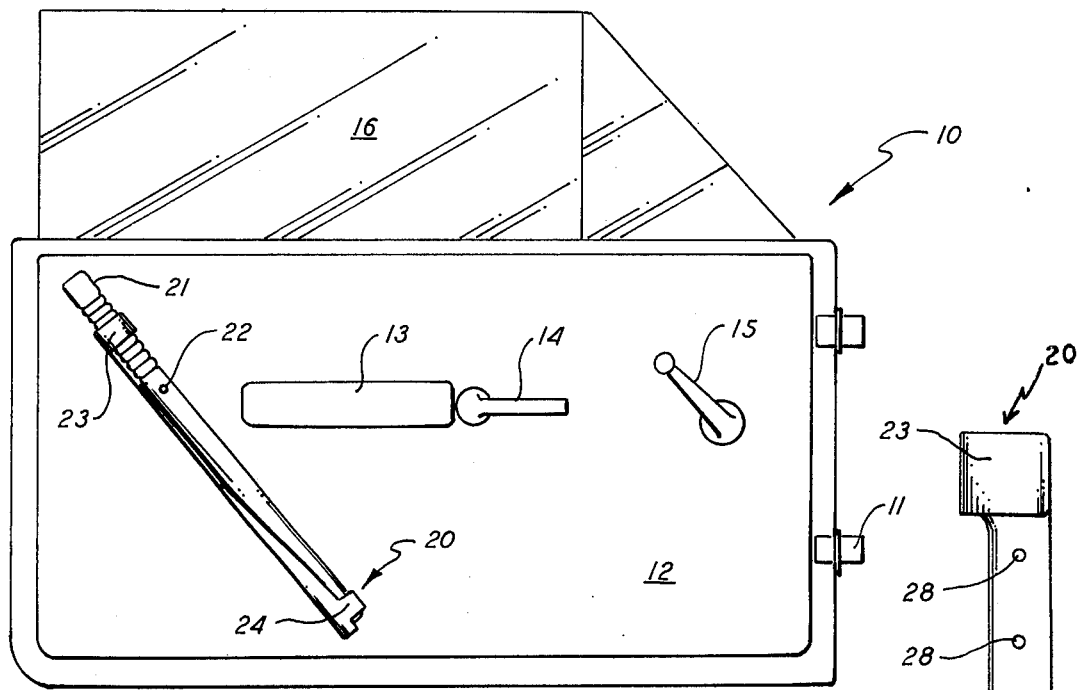
FIG. 1 is a side elevational view of an automobile door showing the holder according to the invention with its contained club in its intended position.

Referring to FIG. 1 the inside of an automobile door 10 on the driver side is shown, the hinges 11 indicating the forward end. On the interior panel 12 of the door is shown the usual arm rest 13 at the driver's side slightly above the level of the seat. Just forward of the rest 13, is a lever 14 for operating the door latch, it being understood that in some widely used cars it is located as shown, although in other cars it may be located elsewhere forward of the armrest. Forward of lever 14, a crank lever 15 for raising and lowering the door window 16 is located near the forward side of the door.

To the rear of armrest 13 a club holder 20 is shown with a police officer's club 21 therein. Adjacent the upper end of club 21 a hole 22 is provided for the usual thong which is looped for passing around the wrist when the club is hand carried. It will be understood that the holder 20 is so fashioned that the thong may be attached to the club without its interfering with the insertion and removal of the club.

The holder 20 is shown in the preferred location on the car door, just to the rear of armrest 13, the bottom end of the holder being under the rest. The holder is preferably inclined at an angle of the order of 30° to 45° from the vertical so that the upper end of club 21 is adjacent the upper trailing edge of panel 12 where it is easily graspable by the driver when he opens the door.

The door 10 of FIG. 1 is dimensioned proportionally to a smaller model of one well known manufacturer and most cars used by police officers are of larger size with bigger doors. The larger doors, of course, have proportionally more room for the holder 20 to the rear of armrest 13.

Figure 3:
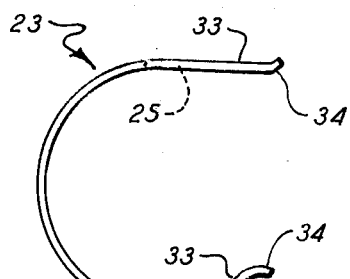
FIGS. 3 and 4 are further enlarge upper and lower end views thereof.
Figure 4:
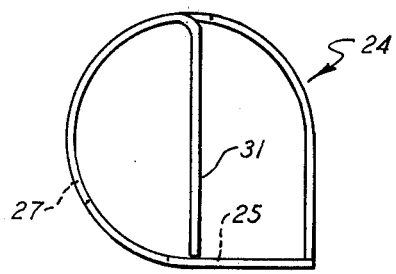
Figure 2:
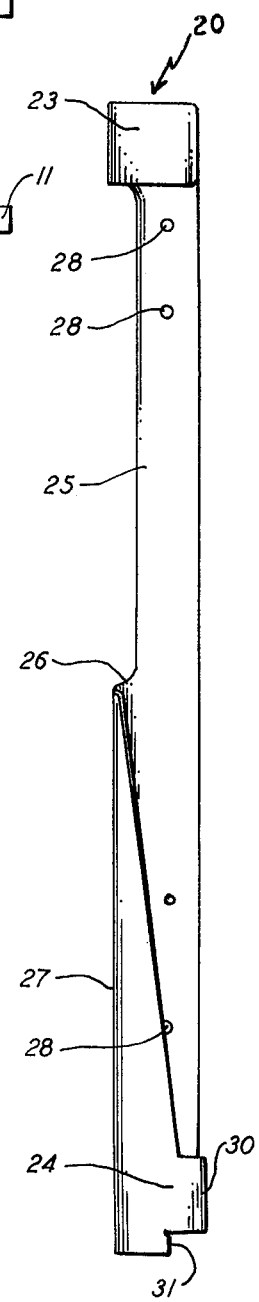
FIG. 2 is an enlarged side elevational view of the holder shown in FIG. 1.

Referring to FIGS. 2, 3 and 4, the holder 20 has a clip portion 23 at its upper end and a socket portion 24 at its lower end. The clip and socket portions are connected by a comparatively narrow substantially flat strip 25. Substantially midway between the ends of the holder the strip 25 is widened arcuately at 26 to partly surround the club and the widened portion 27 becomes progressively wider until it becomes substantially semicircular where it joins the socket portion 24.

A plurality of holes 28 through the strip 25 is provided for fasteners, such as sheet metal screws, to secure the holder to the door panel 12.

Figure 5:
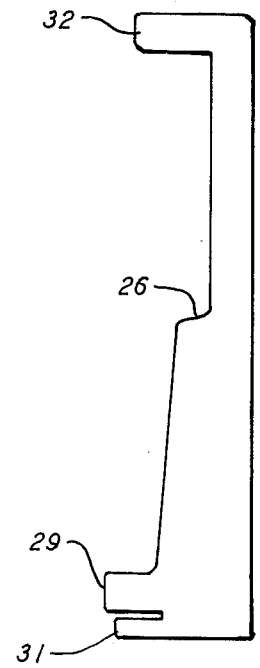
FIG. 5 is a plan view on a reduced scale of a blank from which the holder of FIG. 2 is formed.

Best seen in FIG. 4, the socket portion 24 is formed by bending a laterally projecting tongue 29, shown in the blank in FIG. 5, semicircularly on one side and substantially semicircularly on the other side to form a substantially circular socket side wall 30. The upper end of the socket is open but the bottom is closed by bending another transversely projecting tongue 31 adjacent to tongue 29 on the blank to extend substantially diametrically across the bottom of socket 24, as best seen in FIG. 4, to close the bottom of the socket for the lower end of the club 21.

As best seen in FIG. 3, the upper clip portion 23 of the holder is formed by bending a laterally projecting tongue 32 on the blank in a U-shaped configuration. The legs 33 of the U-shaped clamp project laterally and upwardly, as shown in FIG. 1, and are bent toward one another for clamping against the club, as shown in FIG. 3. The terminal ends of legs 33 are preferably given a slight outward bend at 34 for guiding the club therebetween when it is inserted in the holder and the clip 23 may have an inner lining of a soft fabric adhesively applied.

It will be apparent that, although the holder 20 described above is intended for attachment to the left-hand or driver's door of one-officer cars, a similar holder which is a mirror image of holder 20 may be provided for attachment to the right-hand or passenger-seat door of two-officer police cars.

Four holes 28 are shown in strip 28 for attaching means such as sheet metal screws. The holes are so placed that, although usually only two attaching screws are used, they can be placed where there is a metal portion of the car door or panel therebehind.

I claim:

1. A police officer's club holder for attachment to a vehicle door, comprising: a comparatively narrow strip of manually unbendable metal having holes therethrough for fasteners therethrough for securing the strip to a door, the upper end of the strip being comparatively wider and bent into a substantially U-shaped clip portion for clamping engagement with a club therein, the lower end of the strip being comparatively wider and bent into a substantially circular socket portion for containing one end of a club therein, the socket portion having an integral narrow tongue joined thereto, the tongue being bent into a stop for a club in the socket portion extending diametrically across the bottom end of the socket portion, the substantially U-shaped upper portion being spaced from the substantially circular socket lower portion a distance which is the major portion of the officer's club length, whereby the holder is adapted to be secured to the inner panel of a vehicle door inclined at a small angle from the vertical with the upper end of a club therein projecting from the holder toward the opening side of the door at the top of the panel for being grasped for immediate removal from the holder upon the opening of the door.

* * * * *